April 23, 1968     Z. SZOHATZKY     3,378,905
PRESWAGING TOOL
Filed Oct. 22, 1965     2 Sheets-Sheet 1
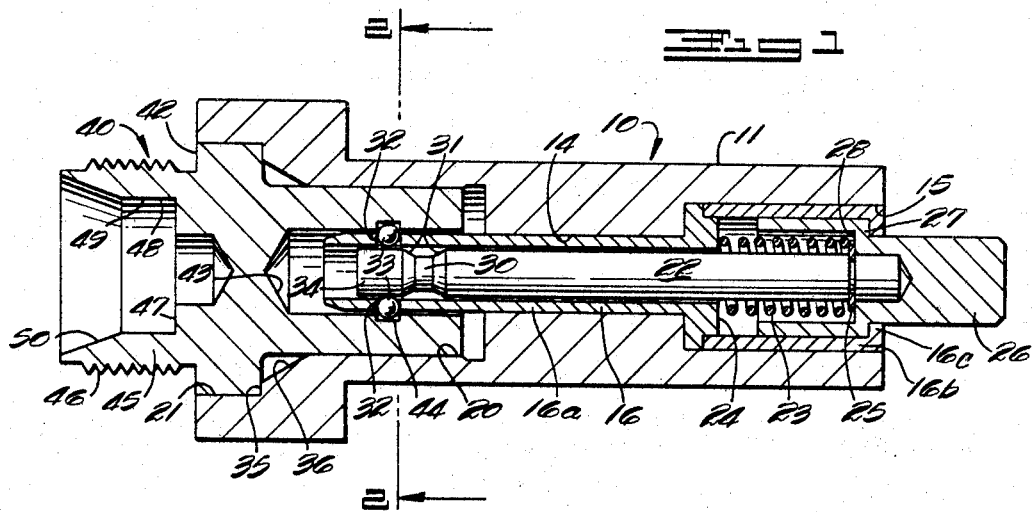
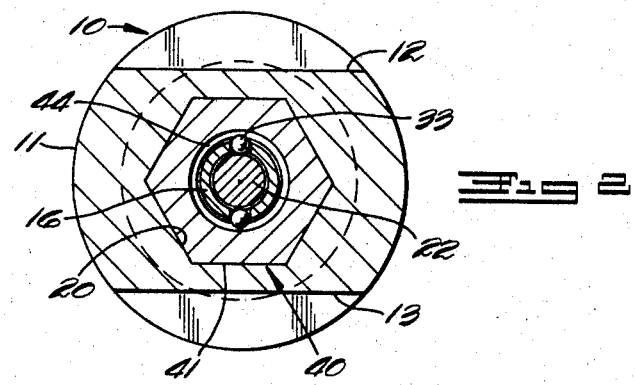
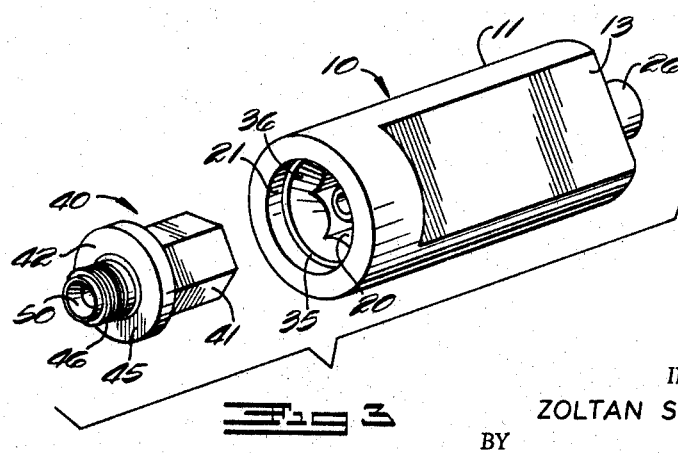
INVENTOR.
ZOLTAN SZOHATZKY
BY
*Fay & Fay*
ATTORNEYS April 23, 1968

Z. SZOHATZKY 3,378,905

PRESWAGING TOOL

Filed Oct. 22, 1965

INVENTOR.
ZOLTAN SZOHATZKY
BY
*Fay & Fay*
ATTORNEYS

United States Patent Office 3,378,905
Patented Apr. 23, 1968

3,378,905
PRESWAGING TOOL
Zolton Szohatzky, Mentor, Ohio, assignor to Crawford
Fitting Company, Solon, Ohio, a corporation of Ohio
Filed Oct. 22, 1965, Ser. No. 500,721
5 Claims. (Cl. 29—200)

ABSTRACT OF THE DISCLOSURE

A tool for preassembling ferrules on the end of a length of tubing by preswaging the ferrules onto the tubing surface. The tool comprises an elongated tool body adapted to be held by a vise or other suitable support, and an assembly head releasably secured to the tool body. The assembly head includes a shank portion receivable in a passage of the body and an end portion including a longitudinal circular cylindrical bore, a radial shoulder, and a flared mouth adapted to receive a piece of tubing. A manual detent on the tool body is operable to selectively engage locking means to release the assembly head from the body for the purpose of attaching various sizes of assembly heads to a single tool body.

---

This application relates to tools and more particularly to a tool for use in the installation of tube fittings. Specifically, this invention relates to a tool which is usable in the pre-assembly of a swage-type tube fitting.

When tube fittings are to be installed in inaccessible or cramped areas or overhead where ladders must be used, it is often difficult to assemble the fitting such that a leak-tight joint is obtained. As a result, it is sometimes advantageous to use a method of preinstalling the fitting on the end of a piece of tube while the tubing is in an open area and then releasing the fitting and attaching the fitting to the tubing followed by a simple retightening of the fitting. For tubing installations which employ simple fittings, various flaring and bending tools have been devised. However, with the more complex, high quality tube fittings designed for use in sophisticated environments these tools are inadequate.

In using these more complex fittings, it is necessary that the fitting be accurately positioned on the end of the tube and that the conditions existing between the tube and the parts of the fitting be carefully controlled. One such type of fitting is illustrated in U.S. Patent No. 2,484,815. With a fitting such as this, it is necessary to accurately position two ferrules in a controlled swaged engagement with the outer surface of the tube wall. Moreover, it is necessary that these ferrules be positioned along the length of the tube such that the tube extends into the fitting body a predetermined distance, thereby assuring the proper engagement of the ferrules with the mouth of the fitting body. It will be readily appreciated that assembling these ferrules on the end of a tubing with any degree of accuracy when the tubing is in an inaccessible area would be extremely difficult.

It is a principal object of this invention to provide a tool whereby portions of a fitting may be preassembled on the end of a length of tubing.

More specifically, it is an object of this invention to provide a preswaging tool which enables ferrules to be swaged on the end of the tube prior to the installation of the tubing in the system.

Another object of this invention is to provide a preswaging tool which may be used with various sizes of tube fittings.

It is a further object of this invention to provide a preswaging tool in which a plurality of different swaging heads which simulate a fitting body are releasably received in the tool so that a particular swaging head may be selected in accordance with the size of the tube fitting to be assembled.

These objects, as well as others which will become more apparent upon a complete reading of the following description, are accomplished by a tool comprising a cylindrical body with opposed flats defining parallel surfaces on opposite sides of the body whereby the body may be received in a support such as a vise. A central bore extends through the body with a counterbore formed in one end of the body coaxial with the central bore. A detent mechanism is received in the central bore with the detent portion of the mechanism extending into the counterbore. The counterbore has a multisurfaced peripheral configuration and is adapted to receive the multisurfaced shank of a swaging head. The swaging head includes a central recess in the shank in which is received the detent mechanism. The detent mechanism serves to releasably retain the swaging head in the tool body. The other end of the swaging head has the same configuration as the mouth of a particular size tube fitting body so that a length of properly dimensioned tubing may be connected to the swaging head by using a fitting nut and ferrules.

In securing the tubing to the swaging head, the ferrules coact with the fitting nut and the mouth of the swaging head in the same manner as when a fitting body is used. As a result, the ferrules are swaged to the length of tubing in the proper position and in the proper amount. The nut may then be unthreaded from the swaging head and the nut and tubing with the preswaged ferrules may be attached to a fitting body. Since the ferrules have been preswaged, it is only necessary to retighten the nut finger tight and snug it up slightly.

Should it be desired to employ a different size of tubing and fittings, it is necessary merely to actuate the detent mechanism to release the swaging head in the tool and replace this head by a head having a mouth configuration in accordance with the dimensions of the new fitting.

Other objects and features will become more apparent upon a complete reading of the following description which sets forth in detail but one approved means of carrying out the invention. Such disclosed means is not meant to be limiting inasmuch as it constitutes but one of the various ways in which the principles of the invention may be applied.

In the drawings wherein like reference numerals indicate like parts in the various views:

FIG. 1 is a view in cross section of the preswaging tool with the swaging head in an assembled position;

FIG. 2 is a sectional view taken along lines 2—2 of FIG. 1;

FIG. 3 is an exploded perspective view of the tool and the swaging head detached from the tool;

Figure 4:
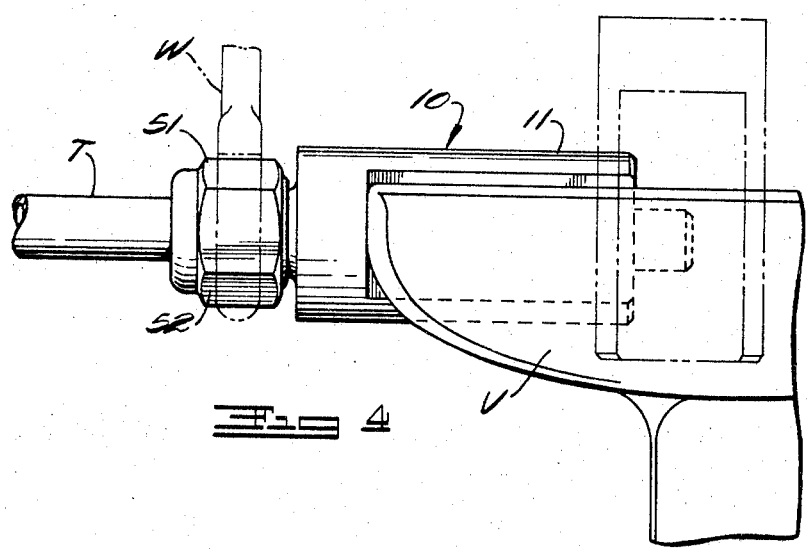
FIG. 4 illustrates the swaging tool received in a vise and a length of tubing being secured to the tool.
Figure 5:
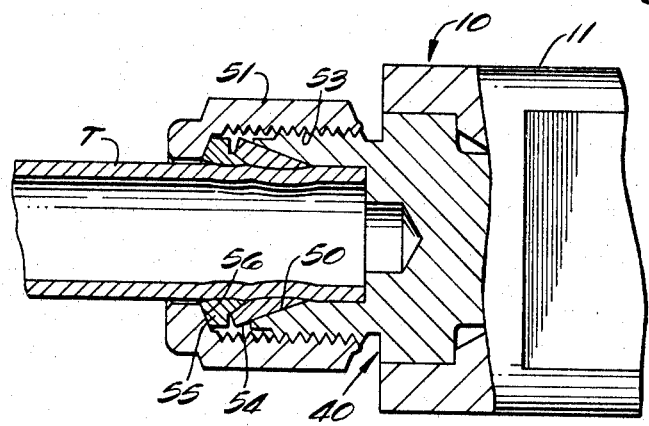
FIG. 5 is a sectional view illustrating a length of tubing secured to the swaging head.

Referring now to the drawings and particularly FIG. 1 thereof, there is illustrated a preswaging tool indicated generally by the reference numeral 10 which comprises the instant invention. This tool includes a body 11 which is substantially cylindrical in configuration. The body has parallel flats 12, 13 formed on opposite sides thereof with the flats extending over a portion of the length thereof. These flats 12 and 13 are designed to provide a gripping surface on the tool 10 during the assembling operation.

The body includes a central bore 14 and a counterbore 15 at one end thereof. Received in the bore 14 and counterbore 15 is a plunger housing 16. The housing includes a tubular portion 16a and an end cap 16b. At the opposite end of the body 11 there is formed a bore 20 which is coaxial with the central bore 14. A counterbore 21 coaxial with the bores 14 and 20 is also formed in the other end of the fitting. One end of the plunger housing 16 extends into the bore 20 as is apparent in FIG. 1.

An elongated plunger or shaft 22 is slidably received in the housing 16. A spring 23 surrounds a portion of the plunger 22 with one end of the spring being abutted against a shoulder 24 formed by the end of the tubular portion 16a and the other end of the spring being abutted against a snap ring 25 carried by the other end of the shaft 22. The spring 23 biases the shaft 22 in a direction away from the bore 20.

A cup shaped cap 26 is received over the end of the shaft 22. The cap includes a radial external shoulder 27 which is adapted to engage a radial shoulder 16c on the end cap 16b. The cap 26 further includes a radial internal shoulder 28 against which the snap ring 25 engages.

The end of the shaft or stem 22 opposite to the spring 23 includes a peripheral groove 30 having tapered walls 31 on either side thereof. The housing 16 includes radial ports 32 which provide communication from the interior of the housing 16 to the outer periphery thereof. Ball detents 33 are disposed in each of these ports with the detents being adapted to be received in the groove 30 when the groove is aligned with the ports 32. Normally, the stem 22 is biased by the spring 23 to the position shown in FIG. 1 wherein the groove is longitudinally displaced from the ports 32 and the ball detents 33 are cammed by the side walls 31 to a radially outward extending position and maintained in this position by the end 34 of the stem 22.

Adapted to be received over the end of the housing 16 in the bore 20 is a swaging head indicated generally by the reference numeral 40. The bore 20 has a multisurfaced configuration on the peripheral walls thereof. The swaging head 40 includes a similarly configured shank 41 on which there are surfaces adapted to cooperate with the surfaces in the bore 20. The swaging head 40 further includes a radial extending flange 42 having a substantially cylindrical configuration which is adapted to be received in and mate with the cylindrical configuration of the bore 21. The thickness of the flange 42 is substantially equal to the depth of the bore 21 so that the flange abuts the shoulder 35 at the juncture of the bore 20 and the bore 21 when the head 40 is fully inserted. A frusto-conical mouth 36 is formed at the juncture of the two bores 20 and 21 which assists in the insertion of the shank 41 into the bore 20.

The shank 41 includes a central recess 43 which is adapted to be received over the end of the plunger housing 16. A peripheral groove 44 is formed in the walls of the recess 43 and is positioned at a point along the recess such that the groove 44 is aligned with the ports 32 when the head 40 is inserted in the body 11. It is readily apparent that with the projection of the ball detents 33 outwardly of the housing 16 into the groove 44 the head is secured in position in the tool body.

The swaging head 40 includes an axially extending portion 45 which has external threads 46. The portion 45 is formed in accordance with the design of the tube engaging portion of a fitting body. Thus, an internal radial shoulder 47 provides an abutment against which the tube is adapted to engage when the tube is in the passage 48 in the swaging head 40. The internal surface 49 of the coupling body adjacent the shoulder 47 is cylindrical for a portion of its length and terminates in a frusto-conical portion 50 which constitutes a flared mouth. The dimensional relationships of the flared mouth, cylindrical portion and the shoulder 47 coincide with the dimensional relationships of the corresponding parts in a particular size of the tube fitting. It is contemplated that a multiplicity of swaging heads 40 corresponding to the various sizes of tube fittings available would be provided with the swaging tool 10 so that for any particular size of tube fitting, the corresponding dimensioned swaging head 40 would be inserted in the tube fitting.

The above described preswaging tool is used in the following manner: Assuming a tubing installation is to be made and it is desired to preassemble a portion of the tube fitting on the end of a length of tube T, a preswaging head 40 corresponding to the size of tube fitting to be employed would be selected. The cap 26 would be depressed against the bias of the spring 23 thereby permitting the retraction of the ball detents 33 into the groove 30 and a selected swaging head 40 would be inserted in the bore 20. Upon insertion of the head 40 into the bore 20 to the position wherein the flange 42 engages the shoulder 35, the cap 26 would be released thereby causing the tapered walls 31 of the groove 30 to cam the ball detents 33 radially outwardly into the groove 44 formed in the swaging head. The swaging head would thereby be secured in the tool body 11 and nonrotatably held in position through the coaction of the surfaces on the shank 41 and in the bore 20.

The swaging tool would then be inserted in a support such as vise V with the surfaces 12 and 13 providing a means for securely gripping the tool and preventing any movement thereof. The end of the tube T to which it is desired to preassemble a fitting would be inserted in the bore 48 until it engages the shoulder 47. A fitting nut and ferrules which had previously been received over the end of the tubing would then be secured to the swaging head. This fitting nut 51 includes tool pads 52 formed on the external surface thereof and is adapted to engage through an internal threaded portion 53 the threads 46 on the exterior of the swaging head. The fitting illustrated herein employs two ferrules, a front ferrule 54 and a back ferrule 55. The front ferrule 54 cooperates with the frusto-conical mouth 50 and the back ferrule engages the rear surface of the front ferrule and abuts the radial shoulder 56 on the nut 51. The action which occurs as the nut 51 is threaded over the swaging head is described in particularity in U.S. Patent No. 2,484,815, to which reference is hereby made. It is believed sufficient to state that as the nut 51 is threaded on the swaging head 40 and tightened with a wrench W, the ferrules are swaged to the end of the tube T and provide a leak-tight joint between the tube and the swaging head 40.

After this has been accomplished the nut 51 is unthreaded which permits withdrawal of the tube T from the swaging head 40. The ferrules 54 and 55 remain swaged to the end of the tube so that the tubing may then be inserted in the body of a tube fitting previously installed in the system. With this arrangement, it is necessary only to retighten the nut 51 fingertight and merely snug up the nut slightly to accomplish a leak-tight joint.

Because of the accurate dimension of the swaging head 40, the swaged ferrules are in the precise location on the tube required for the joint when the tube is inserted in the fitting body. Since the ferrules have been preswaged to the tube, it is unnecessary to apply the torque to the nut 51 which is ordinarily required to affect this swaging action. This is of particular advantage in the type of fitting such as that illustrated herein where the amount of rotation imparted to the nut during the coupling action must be accurately controlled to prevent undertightening or overtightening. Although a specific type of fitting has been illustrated with which the swaging tool has found useful application, it is to be understood that other types of fittings might be used with a tool utilizing the same principles as the tool disclosed herein. Of course, in such instances, the swaging head would be redesigned to simulate the body of the particular type of fitting which is to be employed.

Modifications and changes such as these will suggest themselves to those having ordinary skill in the art. Changes such as these are contemplated by the principles of this invention so that although for ease of description, the principles of the invention have been set forth in connection with but a single illustrated embodiment, it is not intended that this illustrated embodiment or the terminology employed in describing it is to be limiting; but rather, it is my desire to be restricted only by the scope of the appended claims.

I claim:
1. A preassembling tool comprising:
an elongated tool body;
a passage extending longitudinally of said body;
a counterbore at one end of said body communicating with said passage;
an assembly head;
said head having a shank portion at one end thereof receivable in said counterbore;
a recess defined in said shank portion and opening outwardly of the end;
said shank portion and counterbore having mating multiple-surfaced configurations whereby said shank portion is non-rotatably received in said counterbore;
an externally threaded portion on the other end of said head extending externally of said tool body when said shank portion is in said counterbore;
said threaded portion including a longitudinal bore opening outwardly of said other end;
said bore having an internal configuration corresponding to the internal configuration of a conventional tube-fitting body;
said recess in said shank portion including a groove defined in the walls thereof;
retaining means in said passage extending into said counterbore and receivable in said recess in said shank portion when said shank portion is in said counterbore;
said retaining means comprising an elongated housing having a central passage,
elongated stem means in said passage in said housing, operating means in said housing extending externally of said body operable to displace said stem means in said housing;
said stem means including a circumferential groove adjacent one end thereof,
a plurality of radial ports formed in the walls of said housing adjacent one end;
ball detent means in said radial ports;
said ball detent means being dimensioned to be received in the groove in said recess and in the groove in said stem means;
spring means in said passage in said housing biasing said stem means to a position wherein said groove in said stem means is spaced from said radial ports; and
actuating means in said passage in said housing and having a portion thereof accessible from the exterior of said tool body;
said actuating means being operable to displace said stem means against the bias of said spring means.

2. A tool for preassembling ferrules onto the end of a length of tubing by preswaging the ferrules on the tubing surface, said tool comprising:
an elongated tool body including a passage therethrough and a gripping area on the exterior surface thereof,
an assembly head, said head having one end defining a shank portion thereof receivable in said passage, said shank portion and said passage having mating multiple-surfaced configurations whereby said shank portion is non-rotatably received in said passage,
a threaded portion defined on a surface at the other end of said head, said other end extending externally of said tool body when said shank portion is in said passage,
said other end including a longitudinal circular cylindrical bore opening outwardly of said other end, the diameter of said bore being slightly greater than the diameter of a tube to be received therein,
a radial shoulder in said other end defining an abutment in said bore against which a tube abuts when disposed in said bore,
a flared mouth opening outwardly of said bore,
the dimensional relationship of said flared mouth, said radial shoulder and said bore between said flared mouth and said radial shoulder corresponding to similar parts of a particular size of tube fitting to be asembled,
releasable locking means in said passage,
means on said shank portion of said head engageable with said releasable locking means whereby said head may be retained in said passage, and
manual means on said body operable to selectively engage said locking means with said shank portion,
whereby said head may be removed from said tool body.

3. The combination of claim 2 wherein said engageable means on said shank portion of said head comprises a recess in said shank portion and a groove defined in the walls of said shank portion, and said locking means comprises a plurality of ball detents receiveable in said groove; and actuating means engageable with said ball detents and operable to displace said detents in said groove.

4. The tool of claim 2 wherein said assembly head further includes:
an externally threaded portion;
said flared mouth opening outwardly thereof, with the configuration of said flared mouth simulating the configuration of the mouth of a tube fitting body.

5. The tool of claim 2 wherein said assembly head includes a recess in said shank portion with a groove defined in the walls of said shank portion;
said locking means comprising an elongated tubular housing having one end extending into said passage;
radial ports formed in said one end of said housing;
ball detents received in said radial ports; and
stem means in said housing engageable with said ball detents and operable to displace said detents radially outwardly of said housing,
said housing being receivable in the recess in said shank portion, with said ball detents engageable with said groove means when said head is in said passage.

References Cited
UNITED STATES PATENTS

| | | | |
|---|---|---|---|
| 2,484,815 | 10/1949 | Crawford | 285—341 |
| 3,115,798 | 12/1963 | Dondway | 279—2 X |
| 3,172,675 | 3/1965 | Gonzales | 81—177 X |

THOMAS H. EAGER, *Primary Examiner.*